Oct. 29, 1968            P. T. MATTIMOE            3,408,243
DEVICE FOR SECURING A MOUNTING BRACKET TO A WINDSHIELD
Filed May 3, 1965                                           2 Sheets-Sheet 1
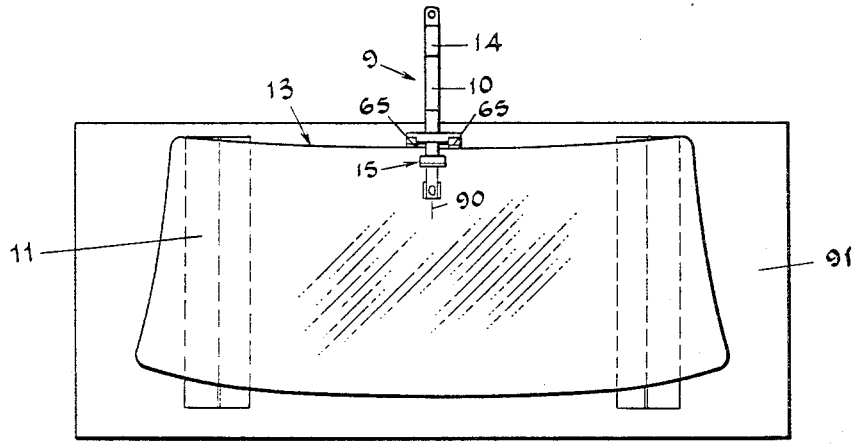
Fig. 1.
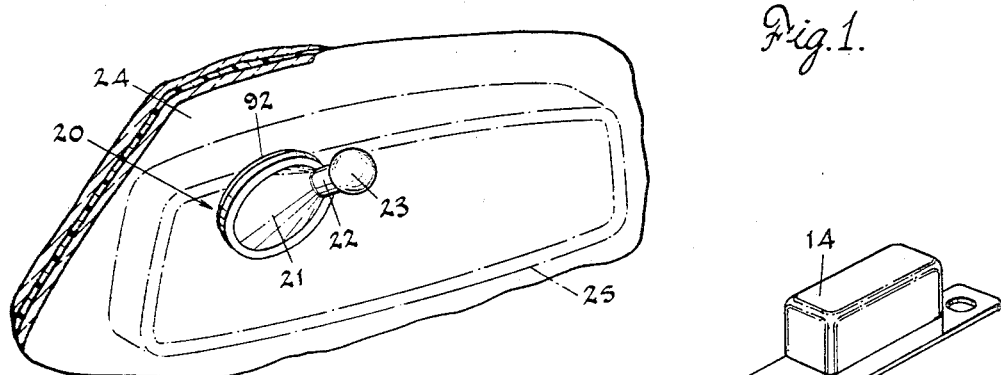
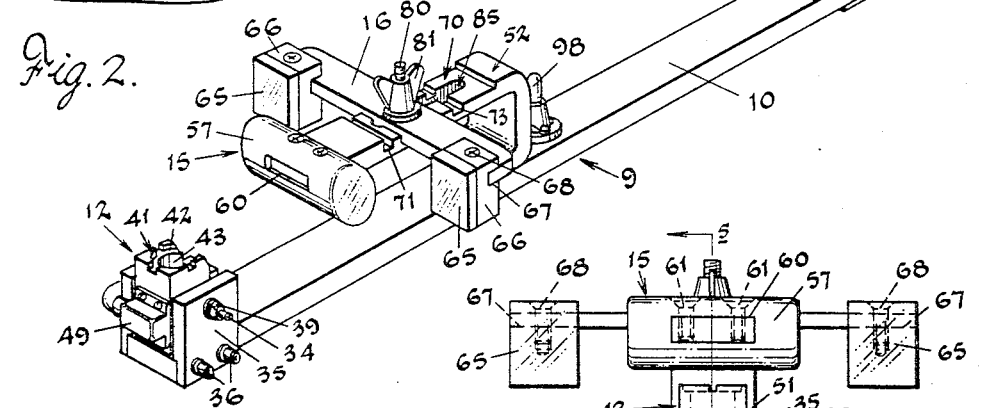
Fig. 3.                          Fig. 4.
INVENTOR.
Paul T. Mattimoe
BY
Nobbe & Swope
ATTORNEYS Oct. 29, 1968    P. T. MATTIMOE    3,408,243
DEVICE FOR SECURING A MOUNTING BRACKET TO A WINDSHIELD
Filed May 3, 1965    2 Sheets-Sheet 2
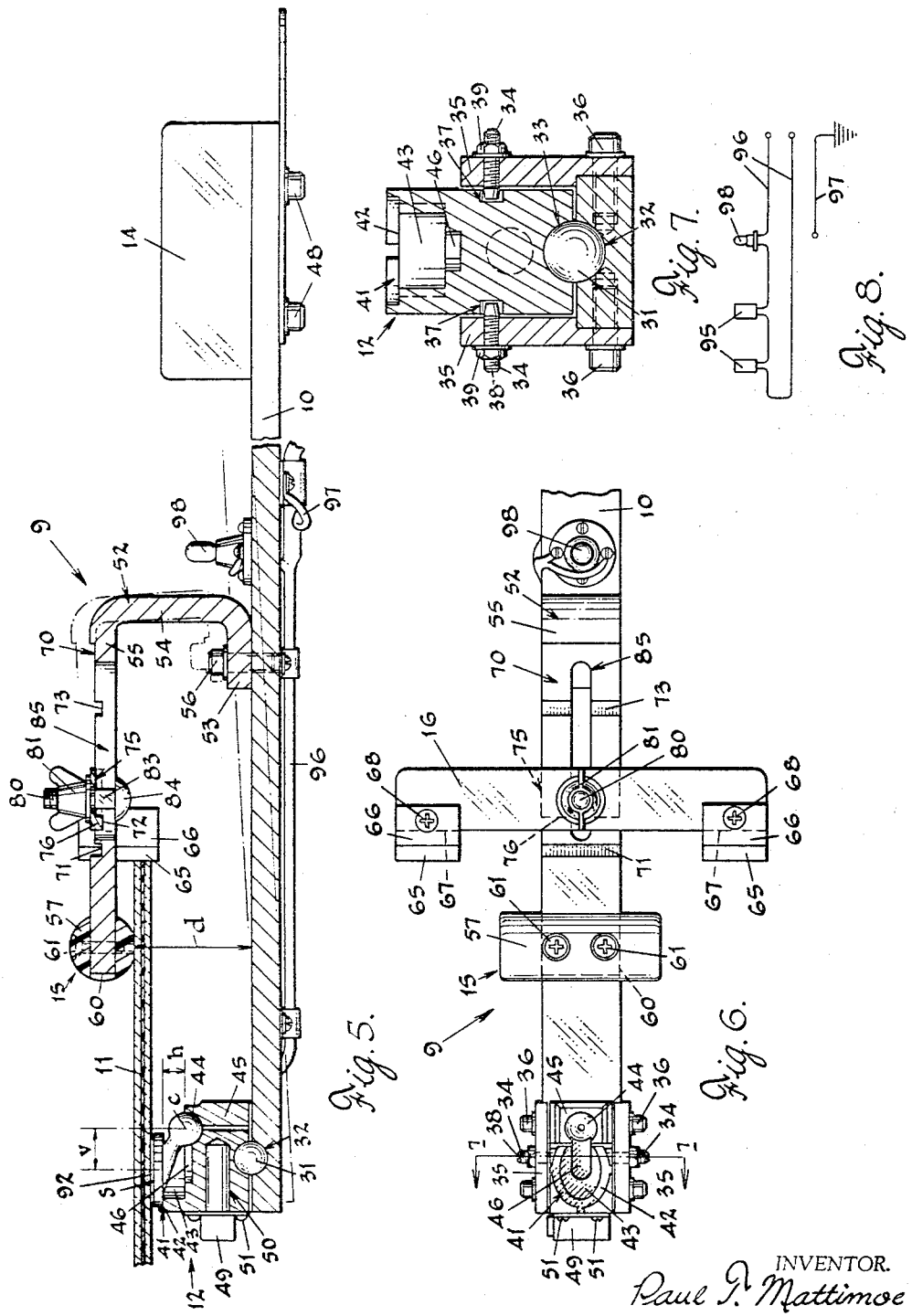
INVENTOR.
Paul T. Mattimoe
BY
Nobbe & Swope
ATTORNEYS & 3,408,243
Patented Oct. 29, 1968

3,408,243
DEVICE FOR SECURING A MOUNTING BRACKET TO A WINDSHIELD
Paul T. Mattimoe, Toledo, Ohio, assignor to Libbey-Owens-Ford Glass Company, Toledo, Ohio, a corporation of Ohio
Filed May 3, 1965, Ser. No. 452,774
3 Claims. (Cl. 156—391)

ABSTRACT OF THE DISCLOSURE

An apparatus for attaching a rear view mirror mounting bracket to an automobile windshield. Also provided is a device for locating the bracket on the windshield which includes means for heating the bracket and for applying a bonding load thereto.

---

The present invention relates broadly to locating and mounting devices and more particularly to an improved apparatus for positioning members with respect to a glass sheet and mounting the same thereon.

The main object of this invention is to provide an improved apparatus for locating brackets accurately and rapidly in a predetermined area of a glass sheet and to facilitate securing of the brackets in place.

Another object is to provide a locator device which can be manually employed to position a mirror mounnting bracket in a predetermined location on a windshield and be freely removed therefrom after the bracket has been permanently secured to the windshield.

Other objects and advantages of the invention will become more apparent during the course of the following description when read in connection with the accompanying drawings.

In the drawings, wherein like numerals are employed to designate like parts throughout the same:

FIG. 1 is a plan view of an automobile windshield with a locator device, constructed in accordance with the invention, positioned thereon;

FIG. 2 is a fragmentary perspective view of the portion of a windshield with a rear view mounting bracket attached to the inner surface thereof;

FIG. 3 is a perspective view of the locator device;

FIG. 4 is an end elevation of the same;

FIG. 5 is a vertical sectional view taken along lines 5—5 of FIG. 4;

FIG. 6 is a fragmentary plan view of the locator device;

FIG. 7 is transverse, vertical, sectional view taken along lines 7—7 of FIG. 6; and FIG. 8 is a diagrammatical view of a heating means for the device.

It has been found that in certain geographic locations having extremely hot climate, actual measurements have shown that a windshield of an automobile can attain a temperature of 170° F. Accordingly, this invention provides a novel method for bonding brackets to a windshield having superior bonding strength, particularly at elevated temperatures, to be capable of withstanding extreme forces which may be applied to the bracket during use. To this end, the novel method provides for bonding a bracket to a windshield by utilizing a light stable adhesive interlayer which will become tacky when heated above room temperature to establish a permanent bond within a few minutes after heat is removed therefrom and may be finally tested immediately for its capability to withstand pressures of forces that may be exerted thereon in use.

The apparatus adapted to be employed in carrying out the above novel method of attachment of a mirror mounting bracket on the surface of an automobile windshield or the like, comprises a device which is equipped with a carrier block having heating means secured thereto and mounted on one end of the device to permit the attaching surface of the bracket to be rapidly and easily secured into full contacting engagement with the windshield surface. Additionally, the apparatus includes a support element or fulcrum which permits the bracket to be properly located on a surface of the windshield while spaced therefrom and then immediately moved into contact therewith. Further, the apparatus includes means which provide a reference with respect to the edge of the windshield that will accurately position a bracket a certain distance from the edge and perpendicular thereto. The apparatus also includes a weight on the end of the device opposite the carrier block that provides sufficient pressure on the bracket mounted in the carrier block which combined with the heating means will effect a permanent bond of the bracket to the glass surface in a short period of time.

Thus, as shown in FIG. 1 of the drawings, a locator device, contructed in accordance with the invention and generally designated by the numeral 9, is illustrated in mounted position with reference to a glass sheet or windshield 11. As briefly mentioned above, a base element or lever bar 10 of the locator device 9, mounts a bracket carrier block 12, at one end thereof which is adapted to be predeterminedly positioned adjacent one surface of the sheet and with reference to edge 13 thereof. A weighted member 14 is located at the opposite end of the lever bar 10. Suitably spaced from the block 12, a support element or fulcrum 15 is provided on the device to support the same on an opposite surface of the sheet and for pivotal movement whereby the carrier block, including a mounting bracket, can be suitably located while spaced from the surface of the sheet and then brought into firm and full contact therewith. Such location of the bracket is obtained by a bar or crossarm 16 adapted to engage the edge of the sheet thereby positioning the bracket at a desired distance from said edge and simultaneously in the plane of a line parallel a line along the transverse axis of the sheet if not coincident therewith.

Referring now to FIG. 2, a typical form of rear view mirror mounting bracket, designated by the numeral 20, includes a base 21, an arm 22 and a spherical support element or ball end 23; the base 21 being attached to the inner surface of an automobile windshield 24 and the arm 22 directed outwardly along a plane substantially perpendicular thereto. A mirror case 25, indicated in broken line, is adapted to be carried by the ball end 23 and to permit the mirror to be angularly adjusted according to the viewing position desired by a driver or other occupant of the automobile. In this connection, the bracket 20 is usually attached to the inner surface of the windshield before it is installed in its functional position within an automobile body and preferably such attachment can be carried out as a final operation in the production thereof.

With more particular reference to the locator device 9, it will be seen in FIGS. 3 to 7, to include an elongated lever bar or base member 10 which not only serves to mount the carrier block 12, the weight 14, the support member 15 and crossarm 16 but as the handle portion by which the locator device per se is conveniently gripped and manipulated.

The carrier block 12, as viewed in FIGS. 5 and 7, is positioned at one end of the bar 10 and is thereon supported on a ball 31 that is seated in a hemispherical recess or socket 32 in the bar and received in a similarly formed recess or socket 33 in the bottom of the block. This permits substantial freedom of movement for the block about a vertical axis, for reasons to be hereinafter more fully described. The block is loosely retained on the ball support 31 by screws 34 that are threaded through keeper plates 35, secured to the sides of the bar 10 by screws 36. The inwardly directed ends of screws 35 are received in recesses 37 (FIG. 7) formed in the respective sides of the block and adapted to be adjusted inwardly and outwardly by the provision of slots 38 in their outer ends. Lock nuts 39 serve to secure the screws in the adjusted positions.

As seen in FIGS. 5 to 7, the body portion of the block is formed with an opening for receiving a heating unit and suitably related recessed areas in which the base and ball element of a mounting bracket are adapted to be readily placed. A heating unit 49, which will be described in more detail later, is received in an opening 50 and retained therein by screws 51 threadedly received in the body of the carrier block 12. The heating unit may be of any type which will maintain a desired temperature of the carrier block body.

With respect to the exemplary type of bracket herein disclosed, the recess for receiving the base of a bracket is formed substantially in the major top surface of the block while the recess for the ball element is disposed in a minor top surface located in downwardly "stepped" relation to the major top surface. For this purpose, the base recess 41 is defined by an oval outline and has a depth approximately the thickness of the base. A ledge or shoulder area 42 for supporting the base portion of the bracket is created by the provision of a second or inner bottoming recess 43 extending downwardly into the body portion of the block.

The recess 44 for receiving the ball element is formed as a hemispherical cavity in a downwardly stepped end portion 45 of the block with the center point $c$ of the cavity being accurately located beneath the level or horizontal plane of the shoulder 42 to agree with the actual dimensional distances of the bracket per se, as indicated by the letter $h$ in FIG. 5. This is also true with regard to the spaced distance between a vertical plane through the transverse axis of the recess 41 and a similar vertical plane through the center point of the recess 44, as indicated by the letter $v$ in the same figure. In this connection, it is believed apparent that the recesses 41 and 44 in carrier blocks can be formed to suit a variety of mounting brackets within the spirit of this invention.

Moreover, the vertical planes through the longitudinal axes of the recess 41 and of the center point $c$ of the recess 44 are accurately located in a coincident plane whereby the vertical plane through the longitudinal vertical axis of a mounting bracket will be judged to be perpendicular to the shoulder 42. This, in part, ensures that the base of the bracket will be substantially parallel with the surface of a windshield when placed thereagainst.

The aforementioned recess 43 and a "bottoming" groove 46 opening into the recessed cavity 44, define an open relief area of suitable size for freely receiving the arm portion of a mounting bracket.

The weight member 14, as in FIGS. 3 and 5, is attached to the opposite or rear end of the elongated lever 10 by means of machine screws 48.

The support member 15 and crossarm 16 are mounted in upwardly spaced, parallel relation to the lever bar or base member 10 by means of a J-shaped member 52 having a short leg mounting portion 53, a vertically disposed web section 54 and a horizontally disposed long leg portion 55. The web portion 53 is fixed to the upper surface of the base member 10 by machine screws 56 in spaced relation to the carrier block 12. The support member 15, as herein provided, comprises a cylindrical block 57 of heat-resistant plastic material which is non-abrasive to a glass surface. The cylindrical block 57 is formed with a central, horizontally disposed slot 60 having an open area adapted to receive the projecting end of leg portion 55; said member 15 being secured thereon by screws 61. In this respect, it is to be noted that a preferred dimensional distance, indicated by the letter $d$, of the surface of the support member 15, opposite to and spaced from the upper surface of the lever bar or base member 10, should be substantially equal to the height elevation of a bracket base when supported in the carrier block plus an average thickness of a solid or laminated safety glass sheet. The length of the web section 54 can thus be determined.

The crossarm 16, also carried by the member 52, is mounted thereon for longitudinal adjustment relative to the lever bar 10, and particularly with reference to the carrier block 12, and is equipped with the sheet edge contacting pads 65 which are adapted to engage the proximate edge of a windshield and thus establish the perpendicular relation of a mounting bracket thereto. For this purpose, each pad 65 comprises a relatively thin piece or block of plastic adhered to the surface of a block 66, which is notched as at 67 for receiving an end part of the crossarm 16 with screws 68 passing through said arm and threadedly received in the blocks. Generally stated, the blocks 66 are located symmetrically equi-distant from the longitudinal axis of the lever bar 10 and with the surfaces of the pads 65 perpendicular thereto. When functionally positioned against the edge of the windshield, the pads 65 thus operate in substantially the same manner as the crosshead of a "T-square" whereby the lever bar 10 will be disposed at a right angle to the said edge.

As viewed in FIG. 5, the upper surface of the leg 55 is relieved to provide a recessed surface 70 in which there are provided transverse notches 71, 72 and 73. These notches are selectively spaced from one another to provide a convenient way for locating the contacting surfaces of the pads 65 at various predetermined distances from the transverse vertical axis of the carrier block 12. In other words, the notches 71, 72 and 73 are formed in the recessed surface 70 to agree with at least three selected distances that a mounting bracket is to be located from the upper edge of a windshield.

With reference now to FIGS. 5 and 6, the crossarm 16 is formed in its undersurface with a centrally disposed substantially rectangular recess 75 having a length longitudinally of the crossarm 16 substantially equal to the width of the leg portion 55, with an end surface spaced from the adjacent edge surface of the crossarm to form a "key" portion 76, which interfits within any of the notches 71, 72 or 73. The crossbar is thus adapted to be selectively located with ease and secured with respect to the selected one of notches 71–73 by means of a "step" bolt 80 and wing nut 81. The bolt 80 is conventionally formed with a square shank portion 83, adjoining the head 84, that is slidably received in an elongated slot 85 provided in and along the central area of the leg portion 55 of the member 52. It is believed apparent that the crossarm can be released from a secured position relative to any one of the notches 71–73 and placed in another selected notch upon loosening of the wing nut 81 and adjusting the square shank 83 lengthwise within the slot 85.

In again considering FIGS. 1 and 5, the locator device 9 will thus be seen as substantially freely and swingably mountable relative to the outer, upwardly directed surface of a glass sheet or windshield 11 by means of the cylindrical support member 15 to accurately locate a mounting bracket 20 in position to be attached to the opposite or inner surface of a windshield. As aforementioned, the base 21 of a mounting bracket is so positioned on the carrier block 12 that the surface $s$ thereof is theoretically parallel to the glass surface. However, since the block 12 is supported on the ball 31, it is adapted to shift radially or "wobble" about on the ball as the base is brought into surface contact thereby eliminating any possibility for the block to restrain the bracket in any position other than one in which the vertical plane of the bracket will be perpendicular or normal to the surface to which it will be attached. Additionally, the pads 65, as viewed in FIG. 1, are engaged with the edge of the sheet or windshield and thus function to determine the inward predetermined distance of the bracket from the said edge and further to ensure that the longitudinal, vertical plane of the bracket will be parallel to, or coincident with, a plane through the transverse axis of the sheet or windshield.

A permanent bond between the mounting bracket 20 and the surface 24 of the windshield is obtained by use of a layer or interlayer 92 of suitable adhesive; said layer being of similar area and outline as the base 21 of the bracket. The adhesive layer should be a light stable interlayer that will become tacky when heated above room temperature and establish a permanent bond within a few minutes after heat is removed therefrom. The interlayer may, if desired, be secured to the surface s of the bracket prior to mounting the bracket on the device.

Although various types of heating units may be utilized to provide the desired amount of heat to the carrier block 12, and in turn the bracket and adhesive layer, an electrical resistance heater is disclosed herein, by way of example. As shown diagrammatically in FIG. 8, the heating unit includes a plurality of fixed resistors 95 being provided with regulated current supplied from a suitable source (not shown) through wires 96 with a warning light 98 interposed in the circuit to indicate when the heated element is operating. The heating element is grounded by a suitable ground wire 97. A heating element of this type, producing approximately 85 watts of power, will maintain the carrier block at a temperature of approximately 350° F.

In practical use, a positioning line, indicated at 90 in FIG. 1, is scribed with a glass marking pencil on the upper surface of the windshield 11 along the transverse axis thereof and perpendicular to the adjacent edge 13. The windshield is supported on a table or like surface 91, and in the event that the glass sheet or windshield is bent about the transverse axis, suitable blocks can be employed to locate the windshield horizontally or in order that the locator device 9 can be conveniently inserted between the lower surface of the windshield and the supporting surface.

Regulated current is provided through wires 96 to the heating element 49 which will preheat the block 12. The bracket is placed in the carrier block 12 with the base 21 being received on the shoulder 42 of the recess 41, the arm in the recess 43 and the ball element 23 in the recess 44 with adhesive layer 92 positioned on the surface of the base 21 to be secured to the windshield. While continuing the application of heat to the carrier block 12 with the heating element 49, the locator device is brought into an initial position with reference to the windshield as shown in FIG. 1 and indicated in broken line in FIG. 5, with the support member 15 resting on the upper surface of the windshield and the pads 65 engaging the upper edge 13. The bracket base 21 is thereby spaced from the surface of the windshield and during its initial positioning the device can be bodily shifted laterally with the pads 65 bearing on the edge 13 until the base 21 registers with the positioning line 90. Since the crossarm 16 is secured with respect to a selective notch 71, 72 or 73, the base 21 will be positioned a predetermined distance from the top edge 13 and by means of the pads 65 the base will also be disposed in perpendicular relation to said edge. By manually swinging the device on the fulcrum 15, the base 21 of bracket with the adhesive layer 92 is brought into engagement with the surface of the glass, and by manually releasing the bar 10, the weight 14 is adapted to exert certain pressure on the carrier block 12.

After a sufficient period of time, during which the weight is exerting pressure on the carrier block that is being maintained at a desired temperature through the heating element or unit 49, the adhesive interlayer 92 effects a bonding of the bracket to the window surface and the locator device may be removed. The bracket and interlayer are then allowed to cool to room temperature without the application of pressure and during this time the bond will become permanent.

It should be noted here that the same results may be obtained without preheating the carrier block by merely increasing the pressure application time.

As pointed out hereinabove, the carrier block 12 is supported on the ball 31 which permits it to freely shift radially thereon to further achieve contacting relation between the layer 92 and the surface of the windshield. This is, of course, of considerable importance under conditions wherein the upper area of the windshield has been bent along its longitudinal axis.

As stated hereinabove, the adhesive layer should be a light stable interlayer which will readily become tacky when heated above room temperature and will quickly establish a final bond after the temperature is lowered to room temperature. By way of example, a specific interlayer which has proven satisfactory in use is a polyvinyl butyral resin plasticized with a suitable plasticizer such as 3GH (triethyleneglycol di-2-ethyl-butyrate) with the 3GH to resin ratio being approximately 21 parts to 100 parts by weight. Of course this ratio may be varied but should remain in the range of 10 to 45 parts by weight plasticizer to 100 parts resin. Furthermore, various other plasticizers, such as di-butyral sebacate or di-butoxyethyl adipate, could be substituted for 3GH. Various other light stable interlayers, known in the art, such as cellulose acetate or cellulose acetate butyrate, could be used in place of the plasticized polyvinyl butyral resin.

With an adhesive such as the specific type disclosed hereinabove and a carrier block body temperature of approximately 340–360° F., a pressure application period of five minutes will sufficiently bond the bracket to the glass surface so that the locator device or pressure applicator may be removed. Furthermore, the bond will immediately become permanent when the bracket temperature is reduced to room temperature. As such the bond may be tested in a matter of minutes after the heated carrier block has been removed. This is of considerable importance in the application of brackets to windshields. By being able to finally check the strength of the securing bond between the bracket and the windshield within minutes after the brackets are initially secured, several handling operations heretofore required can be eliminated, resulting in a considerable saving of manpower and cost.

Of course the temperature of the carrier block could be lowered to as much as 180° F. and the pressure application period considerably increased or the carrier block temperature increased and the pressure application time reduced obtaining the same final bonding between the adjacent surfaces. However, it has been found that a carrier block temperature of more than 380° F. will result in undesirable gaseous bubbles forming in the interlayer after the pressure and heat have been removed from the bracket.

I claim:
1. A device for securing a rear view mirror mounting bracket to a windshield, comprising a lever bar; a support member comprising a cylindrical block of heat resistant non-abrasive material, and a crossarm member mounted in upwardly spaced, parallel relation to said lever bar by means of a J-shaped member having a short leg mounting portion, a vertically disposed web section and a horizontally disposed long leg portion, the short leg portion being fixed to the upper surface of the lever bar while said long leg portion carries the support member and the crossarm member, said crossarm member being mounted for longitudinal adjustment relative to the lever bar and equipped with contacting pads adapted to engage the proximate edge of a glass sheet; a carrier block having first and second openings therein secured to one end of said bar, heating means being received in said first opening with said second opening being adapted to receive said bracket; and a weight on the end of said bar opposite said block and adapted to force said bracket and said block into engagement with a surface of said windshield.

2. Apparatus for attaching a bracket to a horizontally disposed glass sheet, comprising an elongated lever bar; a carrier block loosely attached to one end of said lever bar on a spherical support and adapted to support said bracket in mounting relation to the bottom surface of said sheet; a bracket mounted intermediate the ends of said lever bar, said bracket including a positioning member adjustably mounted thereon and engageable with an edge of said sheet to locate said block a predetermined distance from said edge, and a pivot member adapted to contact the top surface of said sheet substantially along a line spaced inwardly from said edge, the line of contact between said pivot member and said sheet defining a pivot about which said bar and block are rotatable; a weight oppositely disposed from said block along said bar and adapted to cause a moment about said pivot urging said bracket supported by said block against the lower surface of said sheet; and heating means carried by said block and operable to heat said bracket while it is urged against said sheet.

3. Apparatus for attaching a bracket to a horizontally disposed glass sheet as defined in claim 2, in which said heating means comprises an electrical resistance heater received in an opening in said block.

References Cited

UNITED STATES PATENTS 3,130,103   4/1964   Mattimoe et al. _____ 156—391

ROBERT F. BURNETT, *Primary Examiner.*

W. J. VAN BALEN, *Assistant Examiner.*